(12) United States Patent
Zaitsevsky et al.

(10) Patent No.: US 7,604,257 B2
(45) Date of Patent: Oct. 20, 2009

(54) PRINTED PRODUCT

(75) Inventors: Alexei Vadimovich Zaitsevsky, Vilnjus (LT); Boris Alexandrovich Zuev, Zheleznogorsk (RU)

(73) Assignee: Milimarex Limited, Limasol, Cyrus ( * ) Notice: Subject to any disclaimer, the term of this patent is extended or adjusted under 35 U.S.C. 154(b) by 683 days.

(21) Appl. No.: 10/555,295

(22) PCT Filed: Dec. 2, 2004

(86) PCT No.: PCT/RU2004/000477

§ 371 (c)(1),
(2), (4) Date: Nov. 2, 2005

(87) PCT Pub. No.: WO2005/053374

PCT Pub. Date: Jun. 16, 2005

(65) Prior Publication Data

US 2006/0197335 A1    Sep. 7, 2006

(51) Int. Cl.
*B42D 15/00* (2006.01)
*B44F 1/10* (2006.01)

(52) U.S. Cl. .......................... 283/93; 283/109; 283/110; 428/29

(58) Field of Classification Search .................... 283/72, 283/87, 91, 93, 94, 107, 108, 109, 110; 428/68, 428/203, 195.1, 913; 359/2, 3
See application file for complete search history.

(56) References Cited

U.S. PATENT DOCUMENTS

| | | |
|---|---|---|
| 1,996,539 A | 4/1935 | Dufay |
| 2,248,129 A | 7/1941 | Sheridan et al. |
| 4,033,059 A | 7/1977 | Hutton et al. |
| 4,124,947 A | 11/1978 | Kuhl et al. |
| 4,506,916 A | 3/1985 | Kuhl |

(Continued)

FOREIGN PATENT DOCUMENTS

| | | |
|---|---|---|
| CA | 1019012 | 10/1977 |

(Continued)

OTHER PUBLICATIONS

Partial English Translation of RU 2 161 092 dated Dec. 27, 2000.

(Continued)

*Primary Examiner*—Dana Ross
*Assistant Examiner*—Pradeep C Battula
(74) *Attorney, Agent, or Firm*—Ladas and Parry LLP

(57) ABSTRACT

The printed product comprises a carrier (1) provided with a relief on the surface thereof in the form of a plurality of grooves and a main visible image transmitted by an ordered screen, wherein said relief and the screen structure of the visible image are embodied in such a way that at least one additional image becomes manifest on the main image background when a lighting or viewing angle is modified. According to the invention, the angle and period (d) of the groove tracing is equal to the angle and lineature of the main image screen, and geometrical distortions whose value corresponds to the value of tonal gradations of the additional image are introduced into the relief and/or the main image screen structure without breaking the continuity of the pattern lines forming said screen and relief, whereby a nonuniform system of cross-points of the grooves with the screen pattern lines (8) forming said additional image is created.

12 Claims, 5 Drawing Sheets

U.S. PATENT DOCUMENTS 5,199,744 A * 4/1993 Shenton ........................ 283/91
5,582,103 A * 12/1996 Tanaka et al. .................. 101/32
2006/0290136 A1* 12/2006 Alasia et al. .................. 283/72

FOREIGN PATENT DOCUMENTS

RU        2 099 197        12/1997
RU        2 161 092        12/2000

OTHER PUBLICATIONS

Partial English Translation of RU 2 099 197 dated Dec. 20, 1997.

* cited by examiner

PRINTED PRODUCT

BACKGROUND OF THE INVENTION

The present invention relates to printing arts, and more particularly to printed products comprising a main visible image and at least one additional image observed at a definite lighting or viewing angle, which performs in a particular case the function of protecting printed products against counterfeiting.

DESCRIPTION OF THE PRIOR ART

Printed products are known, which comprise, besides a main visible image, an additional latent image, in particular, a pattern, design or inscription, intended for protecting the printed product against counterfeiting thereof by malefactors. Methods of making such products, in which the protective latent image is introduced in the step of preparing a mock-up, and for the visualization of the latent image additional optical keys (templates) are used, have become most widespread. The preparation of a mock-up with protection for the majority of publications is a one-time operation and proves to be economically advantageous only in printing long runs, because it makes possible to use conventional and inexpensive process technologies.

Patent LT-4922B discloses a method of constructing deformed and modified screens, with the aid of which an additional latent image is transmitted for printing. On user's level checking the printed matter produced by such method for authenticity is effected by the appearance of the additional latent image on superposition of a special optical key on the carrier of printed matter. In many cases of using screens with deformed or modified structure in multicolor printing the possibility of exact reproduction of the original image and of the screen particulars distinguishable by an expert, with the use of all duplication technologies available today, on a counterfeit is ruled out. However, some duplication technologies make it possible to execute a copy, on which a latent image will be manifest almost just as well as on the original; this may mislead an ordinary user when determining the authenticity. For determining the authenticity of a sample printed with the use of such technology one cannot do without magnifying facilities which enable to identify the method of screening the sample. In this case the task of counterfeiting can be mademore complicated by using paints which are not transmitted through a conventional color CMYK model, printing products on relief paper, embossing, hot stamping, using lacquers with definite fillers. However, employing the above-mentioned technologies will inevitably lead to increase in the production costs, because it requires an individual approach to each product make-up and not always gives a tangible result.

In RU 2161092 C2 a printed matter is described, comprising a carrier on the surface of which a relief (embossing) is made in the form of a plurality of grooves, and a main, visible image, transmitted by an ordered screen, wherein the relief and structure of the visible image screen are so combined that at least one additional latent image appears on the background of the main image upon variation of the lighting or viewing angle In the case in hand an additional latent image is formed due to exact positioning of the elements of the main graphical pattern on the embossed surface. The hidden information can be seen when the sample is viewed at a definite angle. Due to the fact that the present-day equipment intended for printing large runs does not secure sufficient positioning accuracy during printing and in the course of embossing, the effect of hidden information manifestation will be lost in an appreciable part of production printed matter. This will occur due to the fact that the image elements which had to be located on the definite side of the crests separating the grooves will prove to be on the tops of the crests or on the other side thereof. A considerable enlargement of the pattern, which could simplify the problem of ensuring accurate positioning will inevitably lead to reducing the protective effect and make the external appearance of the product coarser. If the structure of the pattern or relief being printed has a considerable deformation or there is a discrepancy in the period or angle of construction of the two structures, then a regular moiré pattern will appear as the latent image. A meaningful image can be obtained by embossing only individual areas or by an application from screens with different parameters. In banknotes issued by the Russian Bank in the year of 2004 modification there is an element consisting of alternating parallel lines of three colors, over which an embossing is executed as parallel grooves with a close interval but with a small deviation in direction. In side viewing, a regular moiré pattern in the form of oblique multicolored strips originates on the element. When copying, this effect is not repeated, but the element can be easily repeated when preparing a make-up with the aid of a drawing program, if malefactors intend to carry out forgery by industrial techniques.

The methods of forming latent images by positioning graphical elements on a relief surface are also considered in earlier patents: U.S. Pat. No. 1,996,539 (issued in 1933), U.S. Pat. No. 2,248,129 (issued in 1941), U.S. Pat. No. 4,033,059 (issued in 1972), U.S. Pat. No. 4,124,947 (issued in 1978). The described methods make it possible to form on a carrier containing a main visible image areas with a regular moiré pattern in side viewing or to display meaningful additional images, though the latter can be achieved only on condition of exact register of graphical elements and positions contemplated for them on a deformed embossed surface, which condition, as was already stated above, is very difficult to realize in practice.

SUMMARY OF THE INVENTION

It is the main object of the present invention to provide a printed product with an embossed surface, comprising a main visible image and at least one additional latent meaningful image which becomes manifest at a definite viewing angle, which printed product would not require mandatory exact positioning to be observed in manufacturing thereof.

The posed problem is solved by that in a printed product comprising a carrier provided with a relief on the surface thereof in the form of a plurality of grooves and a main visible image transmitted by an ordered screen, wherein said relief and the screen structure of the visible image are embodied in such a way that at least one additional image appears on the main image background when a lighting or viewing angle is modified. According to the invention, the angle and period of the groove tracing is equal to the angle and lineature of the main image screen, and geometrical distortions whose value corresponds to the value of tonal gradations of the additional image are introduced into the relief and/or the main image screen structure without breaking the continuity of the pattern lines forming said screen and relief, whereby a nonuniform system of cross-points of the grooves with the screen pattern lines forming said additional image is created.

It is possible to introduce geometrical distortions into the relief in the form of grooves deviating perpendicular to their direction.

In another variant of executing printed product(s) it is possible to introduce geometrical distortions into the screen structure in the form of deviation of the structural lines defining the arrangement of screen elements in a direction perpendicular to the screen tracing angle.

In a preferred embodiment geometrical distortions are introduced both into the relief and into the structure of the ordered screen in the form of deviation of the grooves and structural lines of the screen perpendicular to their direction.

It is expedient that the deviation value should be no less than the period of the screen grooves tracing.

It is possible that the relief on the carrier surface be formed by laminating said surface with a patterned film.

In a preferred embodiment the carrier surface is provided with a protective layer of a transparent material, which covers up the embossing.

In still another embodiment it is possible that the relief constituted by grooves on the carrier surface be provided with the use of an optical effect in the form of a laminating film comprising alternating transparent and non-transparent strips whose alternation period is equal to the of grooves tracing period, the film thickness not exceeding the grooves tracing period.

In yet another embodiment the printed product comprises, besides a first latent image, a second additional latent image, wherein deviations are additionally introduced into the ordered screen structure, said deviations being directed along the grooves of the relief, the value of said deviations being selected depending on the tonal gradations of the second additional image; and a test template is provided in the form of a transparent film with parallel lines executed thereon, perpendicular to the direction of the grooves, whose tracing period is equal to the lineature of the ordered screen, with the possibility of visualizing the second additional image upon superposition of said pattern on the surface of the carrier.

In another aspect of the invention posed problem is solved by that in a printed product comprising a carrier provided with a relief on the surface thereof in the form of a plurality of grooves and a main visible image which is a vector pattern comprising straight or bent lines formed with preset interval and tracing angle, the relief and visible image being such that at least one latent image appears on the main image background when a lighting or viewing angle is modified. According to the invention, the angle and period of groove tracing is equal to the period and angle of tracing of the vector pattern; and geometrical distortions whose value corresponds to the value of tonal gradations of the additional image are introduced into the relief and/or the vector pattern without breaking the continuity of the pattern lines forming said relief or vector pattern, whereby a nonuniform system of cross-points of the grooves with the vector pattern lines forming said additional image is created.

In the preferred embodiment the carrier in cross-section looks like a saw with regular triangular teeth. In transverse side illumination of the carrier, the alternating longitudinal areas of the surface prove to be in the shade, while in side viewing these areas are masked by the tops of edges which separate the alternating grooves. The latent image becomes manifest, if the grooves on the surface of the carrier have transverse deviations from the rectilinear structure. In another variant of the product the grooves on the surface of the carrier are straight, and the additional image is formed owing to the geometrical structure of the screen being curved in a direction perpendicular to the grooves. The amount of curvature of geometrical structures, by shifting the nodal points perpendicular to the main direction of the lines depends on the tonal gradient of the additional (latent) image in the same coordinates. For the latent image to appear in the form of a contour and with maximum sharpness, irrespective of the accuracy with which the printed screen coincides with the grooves of the surface relief, the maximum deviation value must be close to the full interval of structure line tracing. If the amount of deviation is smaller, the sharpness of the latent image manifestation in a definite part of the run will be impaired. If the amount of deviation is within half of the tracing interval, the latent image shades will correspond to the shades of the prescribed, but only on condition of the screen being exactly positioned on the embossed surface. If the amount of deviation multiply exceeds the tracing interval, the latent image will be sharply manifest in the form of several contour lines. For the neighboring structure lines not to intersect on deviation thereof, the additional image must be sufficiently diffuse. The variant of the product most protected against copying is a carrier on which the latent image is formed partly owing to the deviation of the grooves and partly owing to the curvature of the geometrical structure of the screen. As the screened image use can be made of a vector grid in which a plurality of regular straight lines or lines deformed in an analogous manner, arranged in a direction and with an interval close to the direction and tracing period of the grooves, provide the same effect of latent image manifestation as with the use of screen. The relief on the carrier surface can be provided either when manufacturing the carrier or by subsequent embossing after the image was printed. The product whose surface relief is covered with a layer of lacquer or with some other transparent coating is most protected from forgery, because the form of relief is not accessible for recognition from a print made from the carrier surface. Besides, product with a smooth surface is more durable and less liable to fouling. In another variant of the product a transparent coating of the main image printed on a smooth surface has a surface relief in the form of grooves, and visualization of the additional image occurs owing to the difference of the refraction coefficients between the transparent coating and the environment or a second layer of the coating. In that variant of the product, where the image is printed on a smooth surface and coated with a film constituted by alternating strips of transparent material and appreciably narrower strips of non-transparent material, these alternating strips are directed parallel to the structure lines of the screen and with the same interval, and the film thickness does not exceed the interval value, visualization of the latent image occurring owing to the shadow falling from fine non-transparent strips of the coating on the carrier surface in the case of side lighting or side viewing.

A high degree of protection of the printed product of the invention against copying is achieved by using screens, an exact duplication of which in the absence of original make-up sources is not possible, and owing to an additional surface relief, which rules out scanning a sample and simulating an original screen with the aid of facilities that do not provide their own ordered screen. A dramatic and simple method of rapid authentication makes it possible to employ this technology in most diverse variants of printed products, where protection from forgery, copying, or simply a decorative element is/are required.

BRIEF DESCRIPTION OF THE DRAWINGS

The invention will be further explained by a description of particular examples of embodying thereof and by the accompanying drawings, in which.

DETAILED DESCRIPTION OF PREFERRED EXEMPLARY EMBODIMENTS OF THE INVENTION

Figure 1:
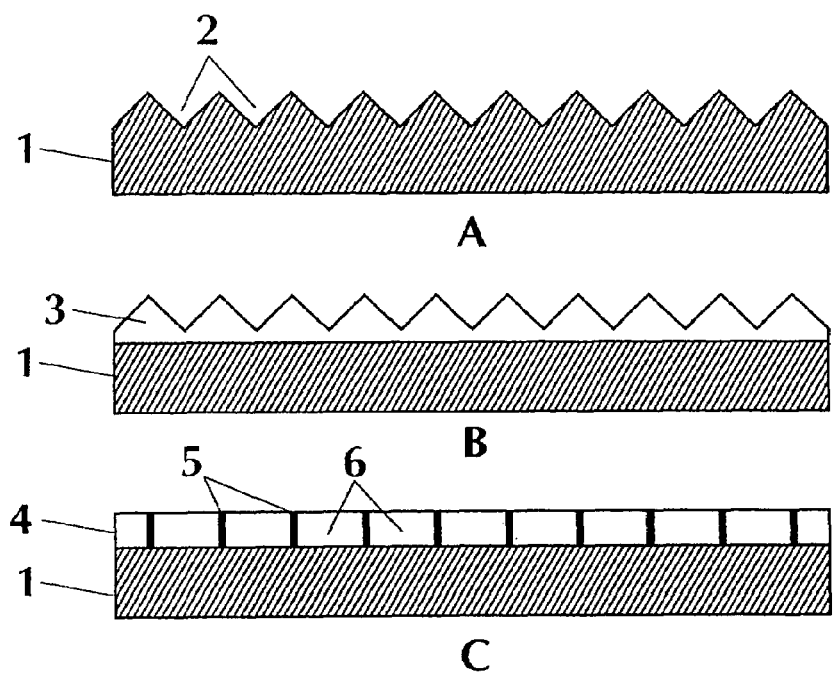
FIG. 1A is a cross-sectional view of a carrier in a direction perpendicular to the direction of relief grooves on the surface of the carrier, according to the invention.
FIG. 1B shows the same as in FIG. A, with the carrier being laminated with an embossed film.
FIG. 1C shows the same as in FIG. A, with the carrier being laminated with a film constituted by alternating transparent and non-transparent strips.

FIG. 1 shows an enlarged cross-sectional view of carrier 1 of a printed product, whose surface is provided with a relief in the form of a plurality of grooves 2 having a triangular profile. Besides, to the surface of the carrier 1 a main image is applied, transmitted by an ordered screen, the angle and period of tracing the grooves being equal to the angle and lineature of the main image. The printed product according to the invention further comprises at least one additional latent image which appears on the background of the main image when a lighting or viewing angle is modified. According to the present invention, the additional image is formed by that into the relief and/or the main image screen structure geometrical distortions are introduced, whose value corresponds to the tonal gradations of the additional image; said distortions do not break the continuity of the structure lines constituting the relief and ordered screen, and are expressed only in their deviation from the initial straight-line direction. Said geometrical distortions make up a nonuniform system of crosspoints of the grooves 2 with the screen pattern lines forming said additional image which is hidden from the observer viewing the main visible image and which manifests itself only when the printed product is turned through a definite angle relative to the source of light or observer's viewing angle. For example, an additional image becomes visible under side illumination transverse to the direction of the grooves or in side viewing. Such manifestation of the additional image is brought about by nonuniform distribution of screen elements in the illuminated and dark areas of the surface or in the areas open to or shut down from the eye. The nonuniform distribution of the screen elements is a consequence of deformation of the screen grid structure or curvature of the relief grooves on the surface. The deformation is carried out in a direction perpendicular to the main direction of the grooves. As was already stated above, the extent of the deformation is associated with the content of a preset additional image.

FIG. 1B shows an enlarged cross-sectional view of carrier 1 whose surface is laminated with an embossed film 3. In this case a part of the screen elements on the carrier are darkened or concealed in side transverse illumination or in side viewing. This occurs due to the difference in the refraction coefficients between the environment and the transparent film 3, on the surface of which a relief is present, identical with the relief of the surface of the carrier shown in FIG. 1A.

FIG. 1C shows an enlarged cross-sectional view of carrier 1, on the surface of which a laminating film 4 is provided, containing narrow non-transparent strips 5 and wider transparent strips 6 alternating therewith. The period of alternating of the strips 5, 6 is equal to the period of tracing the grooves 2 in FIG. 1A, and the thickness of the film 4 does not exceed the period of tracing the grooves. Under side transverse illumination a portion of the screen proves to be in the shade of the non-transparent strips 5. In side viewing a portion of the screen is also masked by the non-transparent strips 5.

Figure 2:
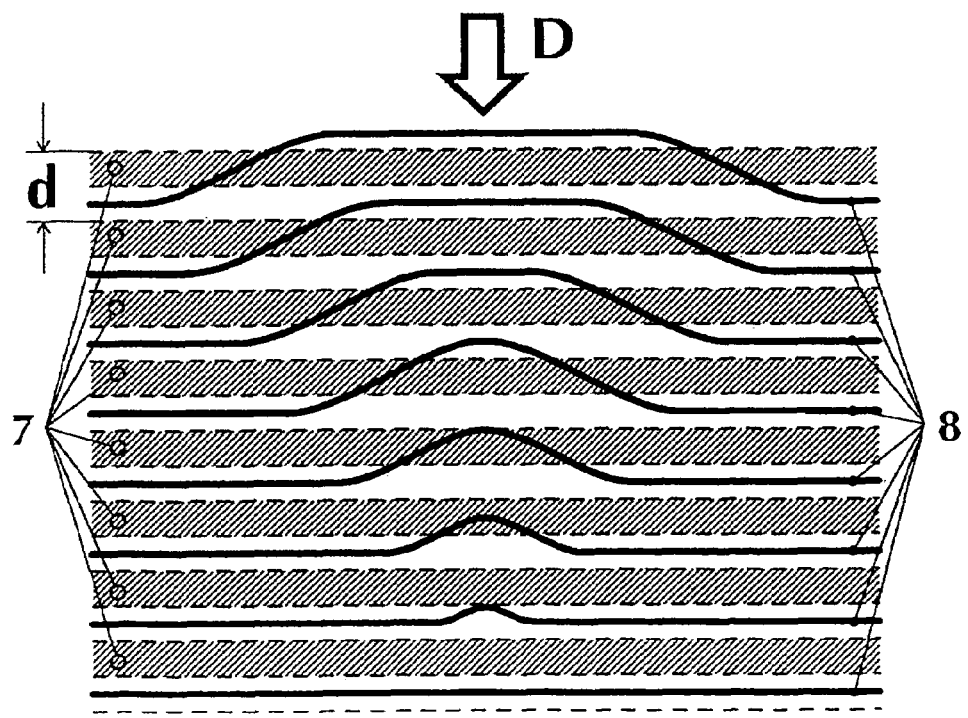
FIG. 2 shows diagrammatically the deformation of the geometrical structure of a screen.

The deformation of the screen structure or of the vector pattern is shown diagrammatically in FIG. 2. Hatched zones 7 of the carrier are in the shade under side illumination along arrow D. Structure lines of the distribution of the screen elements or pattern lines in the vector variant of the image are shown at 8. The deviation of the lines 8 depends on the tonal gradation of the additional image in the same coordinates. Maximum deviation corresponds to one full period d of tracing When deviating, the lines 8 intersect the alternating illuminated and dark areas of the carrier surface. Irrespective of positioning the lines 8 relative to the relief, the latent image manifests itself as a contour of preset additional image.

Figure 3:
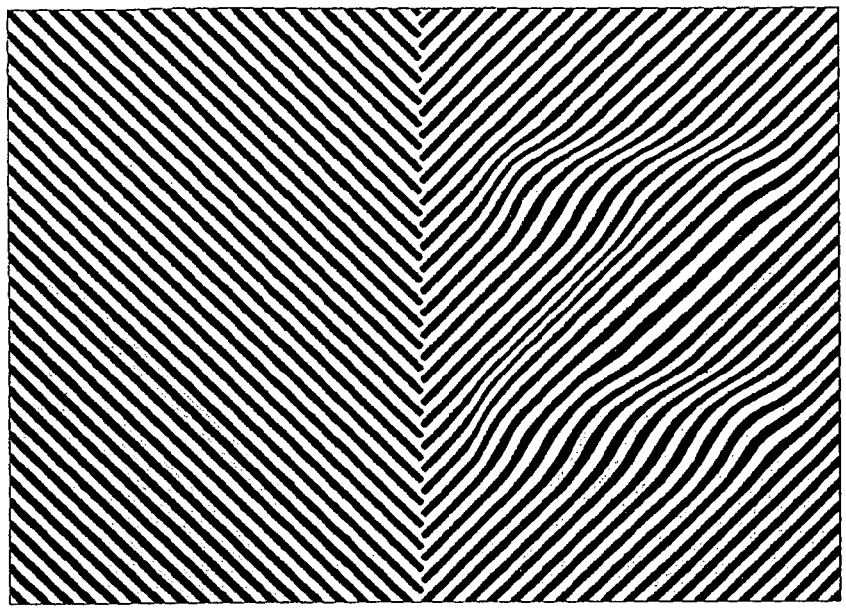
FIG. 3 shows an example of a screen having a deformed structure.

FIG. 3 shows an example of a screen in the form of a smooth background constituted by a line screen. In the lefthand part of the image the screening angle is 45°, structural distortions are absent. In the right-hand part of the image the screening angle is 45°, the screen structure is deformed in a direction perpendicular to the tracing angle by the value determined by the tonal gradations of the additional image, with maximum deviation equal to one tracing period.

Figure 4:
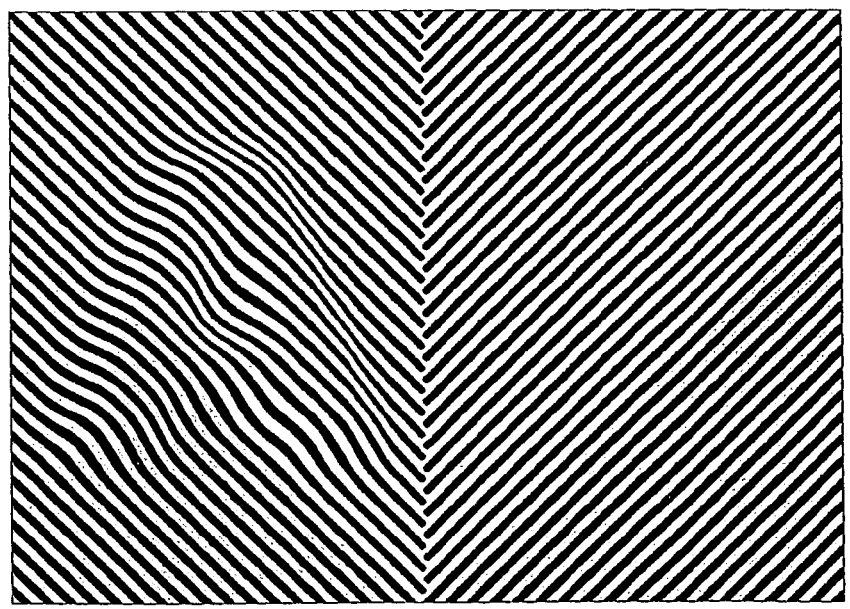
FIG. 4 shows an example of a deformed structure of the carrier surface relief.

FIG. 4 shows an example of the geometrical structure of the carrier surface relief. In the left-hand part of the carrier the angle of tracing grooves is 45°, the geometrical structure is deformed in a direction perpendicular to the groove tracing angle by the value determined by the tonal gradations of the additional image, with maximum deviation also by one period. In the right-hand part of the carrier the groove tracing angle is −45°, distortions of the geometrical; structure are absent.

Figure 5:
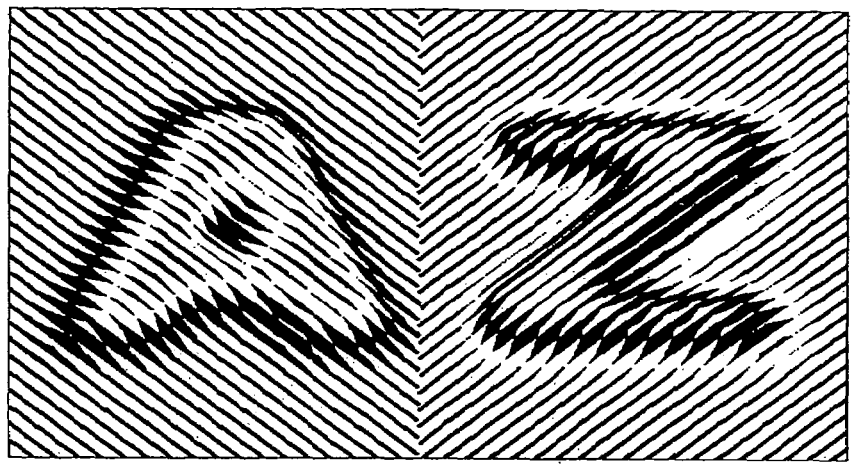
FIG. 5 shows an example of a visualized additional latent image on the carrier upon superposition of a deformed screen according to FIG. 3 and a deformed relief according to FIG. 4.
Figure 5:

FIG. 5 shows a printed product with a manifest latent image when viewed at an acute to the carrier surface on which a relief is provided in accordance with the example; in FIG. 4, and the ordered screen structure is deformed according to the image in FIG. 3. The use of different screening and relieftracing angles renders the scanning difficult, not allowing one to select an optimal angle of sample turning. The presence of deformations both in the screen structure and in the relief structure complicates the simulation of protection.

Figure 6:
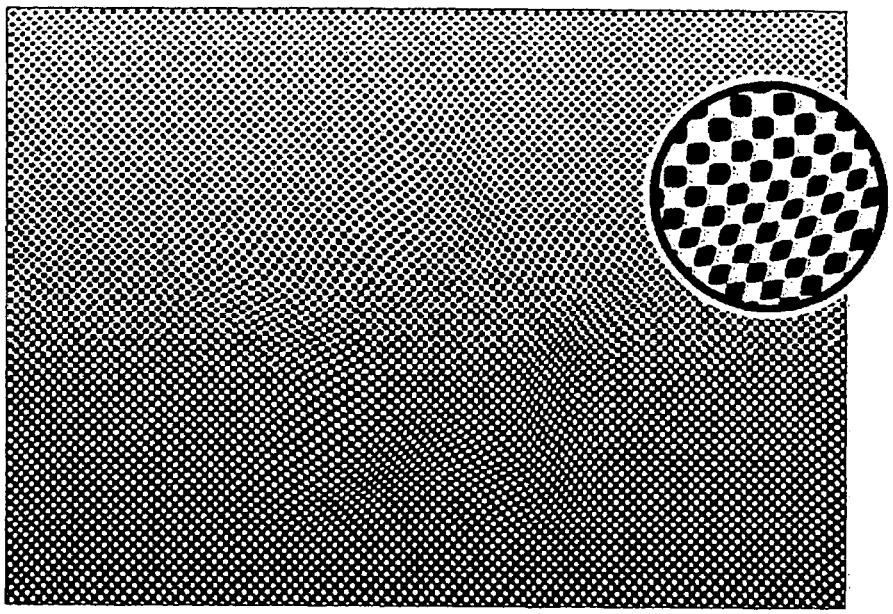
FIG. 6 shows an example of a printed product comprising a main visible image and two additional latent images.

FIG. 6 shows an example of a printed product in which the carrier surface is provided with a main visible image in the form of a background and with two additional latent images. The structure of the main image screen in the direction of 45° is deformed in a direction perpendicular to the screen tracing angle in accordance with the tonal gradations of the first additional image, the maximum deviation exceeding twofold the interval of tracing the screen elements. In the direction of 45° the screen structure is deformed in a direction along the relief grooves in accordance with the tonal gradations of the second image with maximal deviation limited by the half-interval of tracing the screen elements.

Figure 7:
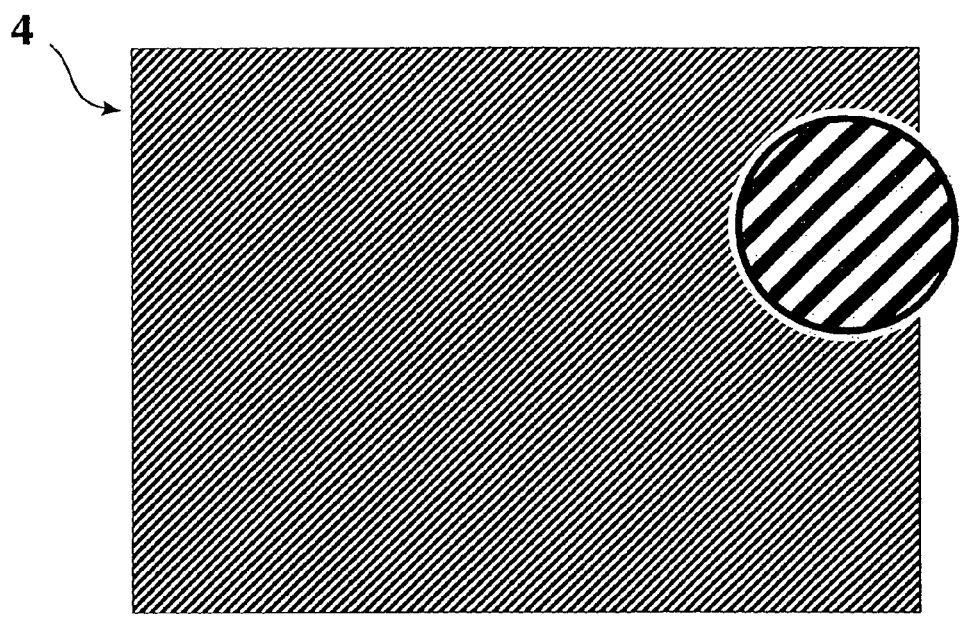
FIG. 7 shows a view overlooking the carrier shown in FIG. 1C.

FIG. 7 shows the geometrical structure of the laminating film applied to the surface of the carrier shown in FIG. 6, said film being shown in cross-section in FIG. 1C. This film has a structure in the form of straight parallel strips 5 the internal between which corresponds to the mean lineature between of the screen in FIG. 6, and the tracing angle is equal to −45°.

Figure 8:
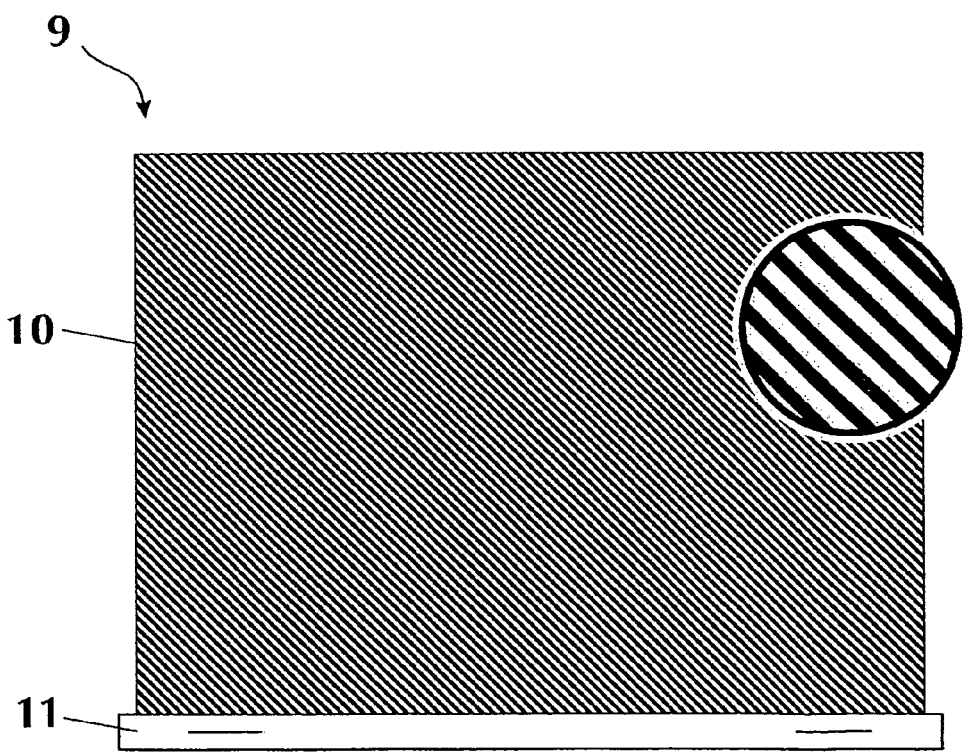
FIG. 8 shows a geometrical structure of a test template suitable for the visualization of the second latent image contained in the printed product presented in FIG. 6.

FIG. 8 shows a template 9 suitable for visualization of the second additional latent image contained in the printed product shown in FIG. 6. The template 9 is a transparent film 10 with a pattern applied thereto, upon superposition of which on the image of FIG. 6 the second latent image manifests itself. The pattern consists of straight parallel lines whose tracing interval is equal to the lineature of FIG. 6, and the angle of tracing is 45°. On one side of the film a rigid holder 11 is secured, with the help of which the film can be conveniently held and matched the film template with the screen on the carrier being tested.

Figure 9:
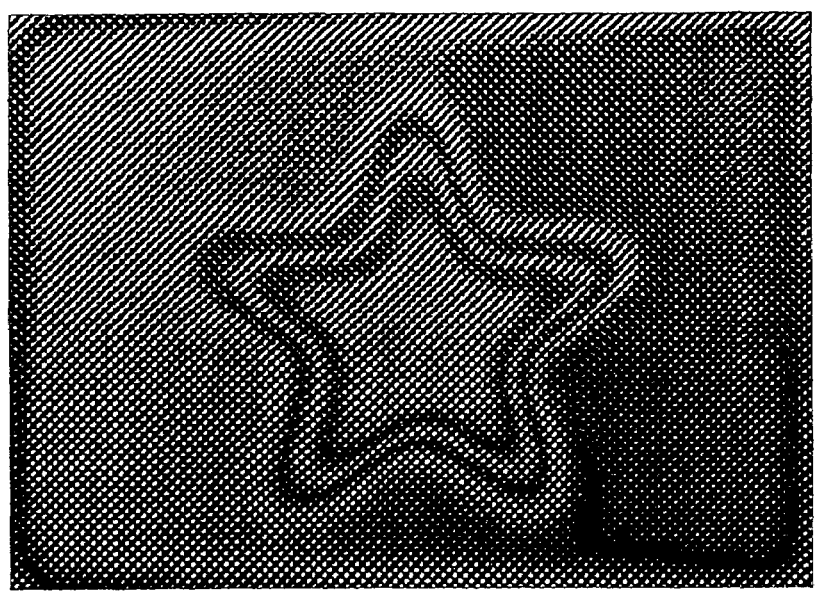
FIG. 9 shows the first latent image contained in the printed product presented in FIG. 6, visualized upon illumination at a preset angle.

FIG. 9 shows the first manifested latent image on the screen carrier of FIG. 6 when illumination is directed along arrow D from the left-hand upper corner or from the lower right corner. The contour manifestation of the image is conditioned by the prescribed value of structure deformation in a direction perpendicular to the lines of the applied film coating. On the sample tonal differences are noticeable between the left-hand and right-hand parts of the image. Such transitions between the image gradations can arise on separate samples of printed products because of inadequate correspondence between the screen and the film coating in the angle of application or in the period of tracing parallel lines. However, this does not interfere with detecting a sharp manifestation of the protective element.

Figure 10:
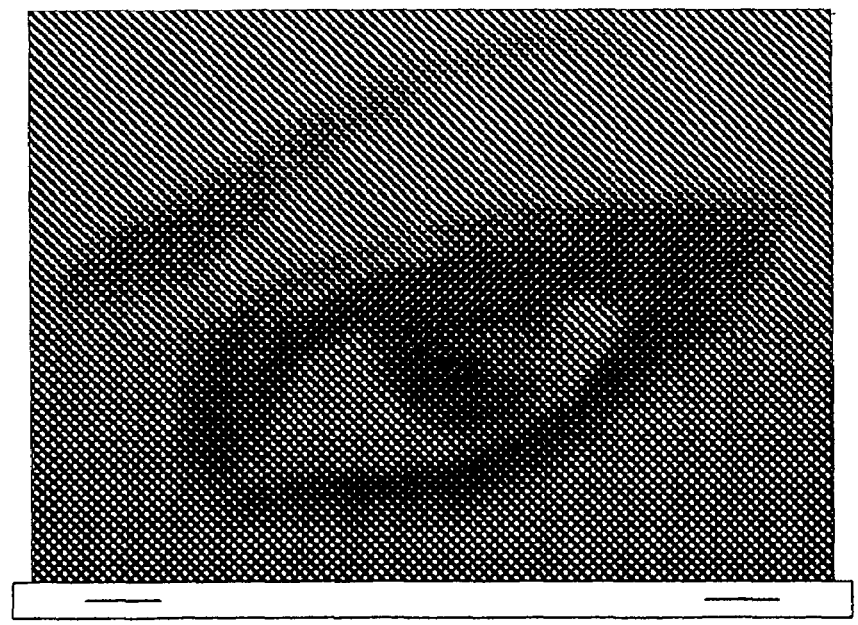
FIG. 10 shows the second latent image contained in the printed product presented in FIG. 6, visualized upon superposition of a test template.

FIG. 10 shows the second manifested latent image on the screen carrier of FIG. 6 upon superposition of a transparent template with the pattern of FIG. 8. For the pattern to be sharply manifest, the angle between the pattern on the film 10 must be strictly in register with the screen on the carrier. In order to simplify the angular matching of the two patterns, a thickened holder 11 is secured on the film 10, one edge of the screened image carrier thrusting against said thickened holder 11. As the template is shifted according to FIG. 10 relative to the screen ac cording to FIG. 6, the second image gradations become modified. A variation in the maximum value of deviation upon deformation of the screen affects only the number of contours of the manifested latent image. However, in any case the meaningful additional image becomes manifest with sufficient sharpness.

The printed product manufactured according to the present invention is characterized by high protective properties, while in manufacturing said product there is no need of observing mandatory exact positioning, whereby expenditures for manufacturing the product can be substantially reduced. Conventional printing arts equipment is applicable for manufacturing such printed product. The printed product is easily identifiable without recourse to any additional means.

INDUSTRIAL APPLICABILITY

The present invention can be used actually for any kind of printed products, where protection against counterfeiting, copying is required or where it is desirable to create a decorative element. The printed product according to the invention does not require developing special appliances and c an be manufactured on conventional graphic arts equipment.

The invention claimed is:

1. A printed product comprising a carrier (1) on whose surface a relief is provided in the form of a plurality of grooves (2), and a main visible image transmitted by an ordered screen, said relief and the screen structure of the visible image being such that at least one additional latent image becomes manifest on the main image background when a lighting or viewing angle is modified, characterized in that the angle and period (d) of tracing the grooves (2) is equal to the angle lineature of the main image screen and geometrical distortions whose value corresponds to the value of tonal gradations of the additional image are introduced into the relief and/or the main image structure without breaking the continuity of the pattern lines forming said screen and relief, whereby a nonuniform system of cross-points of the grooves with the screen pattern lines (8) forming said additional image is created, wherein the relief consisting of grooves on the surface of the carrier is formed with the use of an optical effect by laminating with a film (4) comprising alternating transparent and non-transparent strips (5, 6) whose alternation period is equal to the period (d) of the groove tracing, the thickness of the film (4) not exceeding the period (d) of tracing the grooves (2).

2. The printed product according to claim 1, characterized in that the geometrical distortions are introduced into the relief in the form of deviation of the grooves (2) perpendicular to their direction.

3. The printed product according to claim 2, characterized in that the value of the deviation is no less than the relief groove tracing period (d).

4. The printed product according to claim 1, characterized in that the geometrical distortions are introduced into the screen structure in the form of deviation of the lines (8) of distribution of the screen pattern elements in a direction perpendicular to the screen tracing angle.

5. The printed product according to claim 4, characterized in that the value of the deviation is no less than the relief groove tracing period (d).

6. The printed product according to claim 1, characterized in that the geometrical distortions are introduced into the relief and the ordered screen structure in the form of deviation of the grooves (2) and of the screen pattern lines (8) perpendicular to the direction thereof.

7. The printed product according to claim 6, characterized in that the value of the deviation is no less than the relief groove tracing period (d).

8. The printed product according to claim 1, characterized in that the relief on the surface of the carrier is formed by laminating thereof with an embossed film (3).

9. The printed product according to claim 1, characterized in that a protective layer of a transparent material, concealing the convex relief, is provided on the surface.

10. A printed product comprising a carrier (1) on whose surface a relief is provided in the form of a plurality of grooves (2), and a main visible image transmitted by an ordered screen, said relief and the screen structure of the visible image being such that at least one additional latent image becomes manifest on the main image background when a lighting or viewing angle is modified, characterized in that the angle and period (d) of tracing the grooves (2) is equal to the angle lineature of the main image screen and geometrical distortions whose value corresponds to the value of tonal gradations of the additional image are introduced into the relief and/or the main image structure without breaking the continuity of the pattern lines forming said screen and relief, whereby a nonuniform system of cross-points of the grooves with the screen pattern lines (8) forming said additional image is created, wherein the geometrical distortions are introduced into the relief in the form of deviation of the grooves (2) perpendicular to their direction, and wherein the product comprises a second latent image, deviations being additionally introduced into the ordered screen structure, directed along the grooves (2) of the relief, whose value corresponds to the value of tonal gradations of the second additional image, and a test template (9) is provided in the form of a transparent film (10) with parallel lines executed thereon, perpendicular to the direction of the grooves (2), whose tracing period is equal to the lineature of the ordered screen, with the possibility of the second additional image being visualized upon superposition of the template (9) on the surface of the carrier (1).

11. A printed product comprising a carrier (1) on whose surface a relief is provided in the form of a plurality of grooves (2), and a main visible image transmitted by an ordered screen, said relief and the screen structure of the visible image being such that at least one additional latent image becomes manifest on the main image background when a lighting or viewing angle is modified, characterized in that the angle and period (d) of tracing the grooves (2) is equal to the angle lineature of the main image screen and geometrical distortions whose value corresponds to the value of tonal gradations of the additional image are introduced into the relief and/or the main image structure without breaking the continuity of the pattern lines forming said screen and relief, whereby a nonuniform system of cross-points of the grooves with the screen pattern lines (8) forming said additional image is created, wherein the geometrical distortions are introduced into the screen structure in the form of deviation of the lines (8) of distribution of the screen pattern elements in a direction perpendicular to the screen tracing angle, and wherein the product comprises a second latent image, deviations being additionally introduced into the ordered screen structure, directed along the grooves (2) of the relief, whose value corresponds to the value of tonal gradations of the second additional image, and a test template (9) is provided in the form of a transparent film (10) with parallel lines executed thereon, perpendicular to the direction of the grooves (2), whose tracing period is equal to the lineature of the ordered screen, with the possibility of the second additional image being visualized upon superposition of the template (9) on the surface of the carrier (1).

12. A printed product comprising a carrier (1) on whose surface a relief is provided in the form of a plurality of grooves (2), and a main visible image transmitted by an ordered screen, said relief and the screen structure of the visible image being such that at least one additional latent image becomes manifest on the main image background when a lighting or viewing angle is modified, characterized in that the angle and period (d) of tracing the grooves (2) is equal to the angle lineature of the main image screen and geometrical distortions whose value corresponds to the value of tonal gradations of the additional image are introduced into the relief and/or the main image structure without breaking the continuity of the pattern lines forming said screen and relief, whereby a nonuniform system of cross-points of the grooves with the screen pattern lines (8) forming said additional image is created, wherein the geometrical distortions are introduced into the relief and the ordered screen structure in the form of deviation of the grooves (2) and of the screen pattern lines (8) perpendicular to the direction thereof, and wherein the product comprises a second latent image, deviations being additionally introduced into the ordered screen structure, directed along the grooves (2) of the relief, whose value corresponds to the value of tonal gradations of the second additional image, and a test template (9) is provided in the form of a transparent film (10) with parallel lines executed thereon, perpendicular to the direction of the grooves (2), whose tracing period is equal to the lineature of the ordered screen, with the possibility of the second additional image being visualized upon superposition of the template (9) on the surface of the carrier (1).

* * * * *